(12) United States Patent
Miller et al.

(10) Patent No.: US 10,452,073 B2
(45) Date of Patent: Oct. 22, 2019

(54) VEHICLE CONTROL SYSTEMS AND METHODS OF CONTROLLING VEHICLES USING BEHAVIOR PROFILES

(71) Applicant: Toyota Research Institute, Inc., Los Altos, CA (US)

(72) Inventors: Katarina R. C. Miller, Palo Alto, CA (US); Julian M. Mason, Redwood City, CA (US); James J. Kuffner, Sunnydale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 200 days.

(21) Appl. No.: 15/600,160

(22) Filed: May 19, 2017

(65) Prior Publication Data

US 2018/0335785 A1 Nov. 22, 2018

(51) Int. Cl.
*B60W 50/00* (2006.01)
*B60W 30/06* (2006.01)
(Continued)

(52) U.S. Cl.
CPC ....... *G05D 1/0221* (2013.01); *B60W 50/0097* (2013.01); *B60W 50/0098* (2013.01); *G08G 1/161* (2013.01); *B60W 10/10* (2013.01); *B60W 10/18* (2013.01); *B60W 10/20* (2013.01); *B60W 30/06* (2013.01); *B60W 30/12* (2013.01); *B60W 30/162* (2013.01); *B60W 2050/0075* (2013.01); *B60W 2420/42* (2013.01); *B60W 2520/06* (2013.01); *B60W 2520/105* (2013.01);
(Continued)

(58) Field of Classification Search
CPC ... G05D 1/0221; G05D 1/0088; B60W 10/10; B60W 10/18; B60W 10/20; B60W 30/06; B60W 30/12; B60W 30/162
See application file for complete search history.

(56) References Cited

U.S. PATENT DOCUMENTS 8,660,734 B2  2/2014  Zhu et al.
9,216,737 B1  12/2015  Zhu et al.
(Continued)

FOREIGN PATENT DOCUMENTS

KR  20170044786 A  *  4/2017

OTHER PUBLICATIONS

KR-20170044786-A, 2017—Translation (Year: 2017).*

*Primary Examiner* — Anne M Antonucci
*Assistant Examiner* — Renee LaRose
(74) *Attorney, Agent, or Firm* — Dinsmore & Shohl LLP

(57) ABSTRACT

Vehicle control systems and methods for controlling a vehicle using behavior profiles of neighboring vehicles are disclosed. In one embodiment, a vehicle control system of a vehicle includes one or more processors and one or more non-transitory memory modules communicatively coupled to the one or more processors and storing machine-readable instructions that, when executed, cause the one or more processors to perform at least at the following: detect a neighboring vehicle within an environment, determine an autonomous software version executed by the neighboring vehicle, determine a behavior profile associated with the autonomous software version, and control one or more vehicle systems of the vehicle based at least in part on the behavior profile associated with the autonomous software version.

20 Claims, 6 Drawing Sheets

(51) Int. Cl.
  *B60W 30/12* (2006.01)
  *B60W 30/16* (2012.01)
  *G05D 1/02* (2006.01)
  *G08G 1/16* (2006.01)
  *B60W 10/10* (2012.01)
  *B60W 10/18* (2012.01)
  *B60W 10/20* (2006.01)

(52) U.S. Cl.
  CPC ... *B60W 2550/308* (2013.01); *B60W 2720/10* (2013.01); *B60W 2750/308* (2013.01)

(56) References Cited

U.S. PATENT DOCUMENTS

| | | |
|---|---|---|
| 9,224,299 B2 | 12/2015 | Taguchi et al. |
| 9,296,299 B2 | 3/2016 | Ricci |
| 2015/0149019 A1 | 5/2015 | Pilutti et al. |
| 2015/0161894 A1 | 6/2015 | Duncan et al. |
| 2016/0068156 A1 | 3/2016 | Horii |
| 2016/0226807 A1 | 8/2016 | Bain et al. |
| 2016/0347309 A1 | 12/2016 | Vijayan et al. |
| 2017/0253241 A1* | 9/2017 | Filev ................ B60W 50/0097 |

\* cited by examiner

VEHICLE CONTROL SYSTEMS AND METHODS OF CONTROLLING VEHICLES USING BEHAVIOR PROFILES

TECHNICAL FIELD

Embodiments described herein generally relate to vehicle control systems and, more specifically, to vehicle control systems for controlling a vehicle based on behavior profiles of autonomous software executed by neighboring vehicles.

BACKGROUND

Many vehicles may detect and observe surrounding objects within the environment. Vehicles may be autonomously or semi-autonomously controlled. In the case of an autonomously controlled vehicle, the vehicle navigates the environment without human input. In the case of semi-autonomously controlled vehicles, a human operator controls the vehicle with computer input, such as lane keeping assist, adaptive cruise control, collision avoidance, and the like.

There are many different vehicle manufactures that sell a wide variety of vehicles that may operate using different versions of autonomous software or other software/algorithms. These various autonomous software versions may control the various vehicles differently. Thus, an autonomously or semi-autonomously controlled vehicle may not be able to account for actions of neighboring vehicles due to the uncertainty regarding how the neighboring vehicles may operate within the environment.

Accordingly, a need exists for alternative vehicle control systems and methods that account for the autonomous software of neighboring vehicles.

SUMMARY

In one embodiment, a vehicle control system of a vehicle includes one or more processors and one or more non-transitory memory modules communicatively coupled to the one or more processors and storing machine-readable instructions that, when executed, cause the one or more processors to perform at least at the following: detect a neighboring vehicle within an environment, determine an autonomous software version executed by the neighboring vehicle, determine a behavior profile associated with the autonomous software version, and control one or more vehicle systems of the vehicle based at least in part on the behavior profile associated with the autonomous software version.

In another embodiment, a method of controlling a vehicle includes detecting a neighboring vehicle within an environment, determining an autonomous software version executed by the neighboring vehicle, determining a behavior profile associated with the autonomous software version, and controlling one or more vehicle systems of the vehicle based at least in part on the behavior profile associated with the autonomous software version.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to vehicle control systems and methods that determine autonomous software versions executed by neighboring vehicles within an environment, and predict future behavior of the neighboring vehicles based on behavior profiles associated with the detected autonomous software versions.

There are many different automobile manufactures that manufacture and sell various models of vehicles. As software is always being updated, multiple versions of autonomous software may be running on various vehicles within the environment. There may be differences among the plurality of autonomous software versions regarding how the vehicles are controlled in various situations. To accurately control a vehicle that may be under autonomous or semi-autonomous control, it may be desirable to understand how a neighboring vehicle also under autonomous or semi-autonomous control may behave within the environment. If the vehicle control system understands how the neighboring vehicle is controlled, as well as its physical characteristics and capabilities, the vehicle control system may predict the future behavior of the neighboring vehicle and thus adapts its autonomous or semi-autonomous control of the vehicle in response to the predicted future behavior.

As described in detail below, embodiments of the present disclosure detect or otherwise determine a vehicle type and an autonomous software version in a variety of ways. Embodiments of the present disclosure also store behavior profiles regarding the operation of vehicles executing the autonomous software versions in various situations. The control of a target vehicle may be influenced by the behavior profile of one or more autonomous software versions associated with one or more neighboring vehicles within the environment.

Various embodiments of vehicle control systems and methods for controlling a vehicle based on behavior profiles of autonomous software versions are disclosed below.

Figure 1:
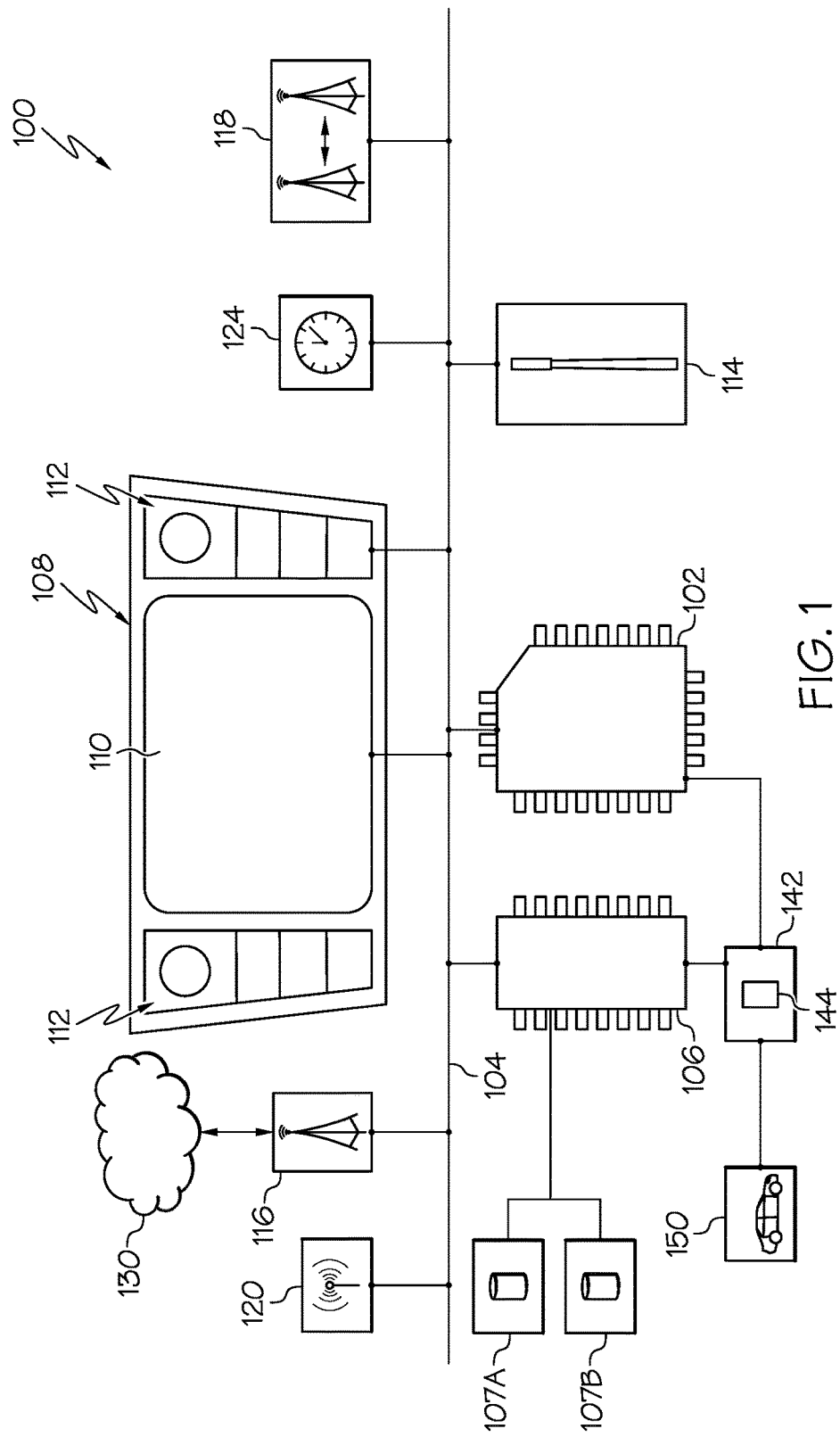
FIG. 1 schematically depicts an example vehicle control system, according to one or more embodiments shown and described herein.
Figure 2:
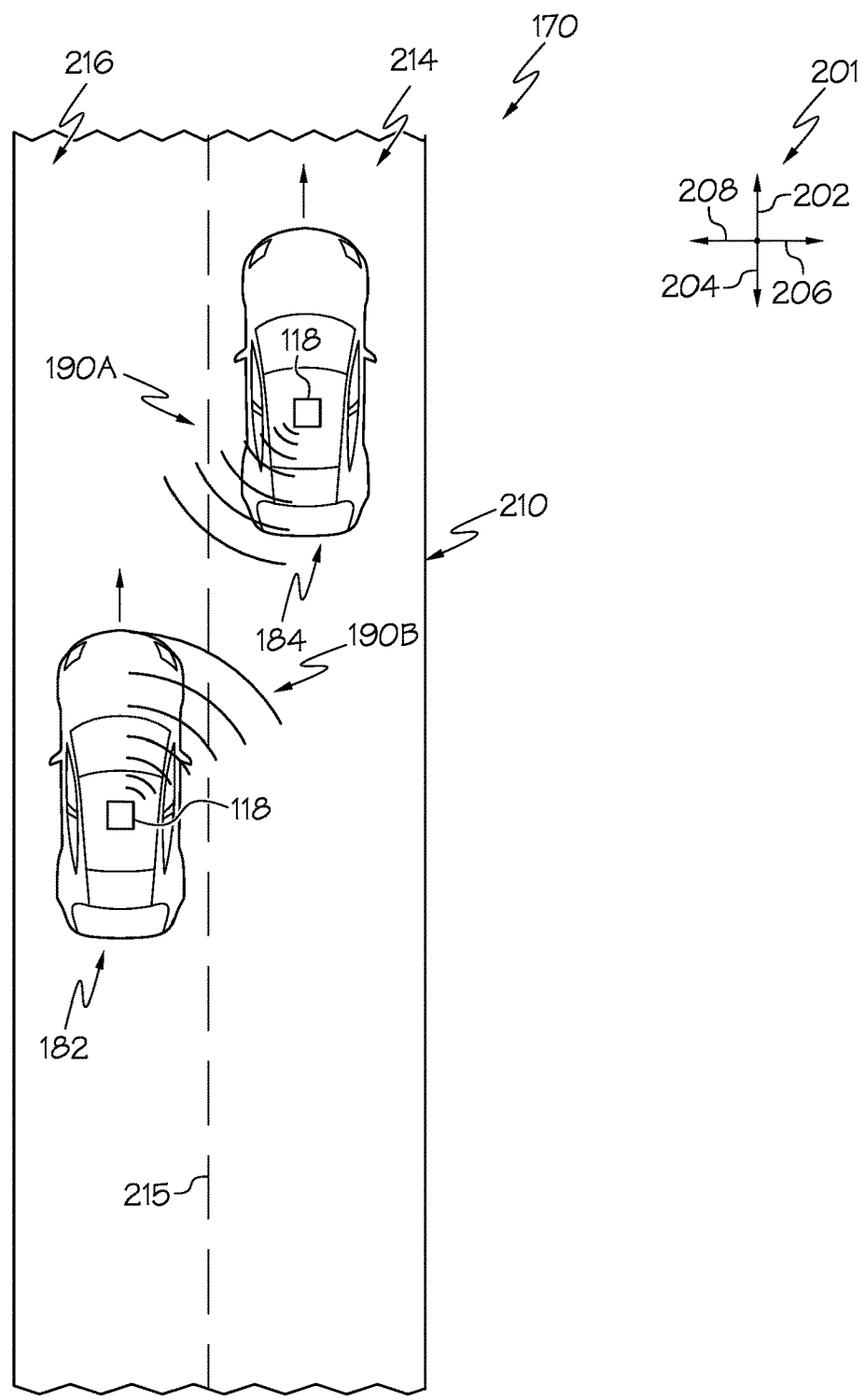
FIG. 2 schematically depicts an example vehicle operating environment including a plurality of vehicles, according to one or more embodiments shown and described herein.

Referring now to FIG. 1, an example vehicle control system 100 is schematically depicted. It is noted that, while the vehicle control system 100 is depicted in isolation, some or all of the components of the vehicle control system 100 may be included within one or more vehicles, for example, a target vehicle 182 and/or a plurality of neighboring vehicles 184, as depicted in FIG. 2. As depicted in FIG. 1, the vehicle control system 100 includes one or more processors 102. Each of the one or more processors 102 may be any device capable of executing machine-readable instructions. Accordingly, each of the one or more processors 102 may be a controller, an integrated circuit, a microchip, a computer, or any other computing device. The one or more processors 102 are coupled to a communication path 104 that provides signal interconnectivity between various components of the vehicle control system 100. Accordingly, the communication path 104 may communicatively couple any number of processors 102 with one another, and allow the components coupled to the communication path 104 to operate in a distributed computing environment. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Moreover, the vehicle control system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 106 may also store data utilized by the one or more processors 102 to perform the functionalities described herein. For example, the one or more memory modules may store a plurality of vehicle behavior profiles associated with a plurality of autonomous software versions and/or vehicles in a first database 107A and a plurality of driving behavior patterns associated with a plurality of autonomous software versions and/or vehicles in a second database 107B. As used herein, the phase "autonomous software version" means any version of software executed by a vehicle capable of autonomous control (i.e., no human input in vehicle control) or semi-autonomous control (i.e., human input of vehicle control with computer-assisted control). Other data may also be stored within the one or more memory modules 106, such as image data for known vehicles, geographic data, autonomous vehicle data, and the like. It should be understood that the various types of data described herein may be stored in separate databases or in a single database.

Referring still to FIG. 1, the example vehicle control system 100 may comprise a human machine interface (HMI) 108 communicatively coupled to the communication path 104 and comprising a display 110 and tactile input hardware 112. The HMI 108 is coupled to the communication path 104. Further, the HMI 108 may be located within the one or more vehicles. The display 110 of the HMI 108 provides visual output such as, for example, selection tools, maps, navigation, entertainment, autonomous operation information, or a combination thereof. The display 110 may include any medium capable of transmitting an optical output such as, for example, a cathode ray tube, light emitting diodes, a liquid crystal display, a plasma display, or the like. Moreover, the display 110 may be a touchscreen that, in addition to providing optical information, detects the presence and location of a tactile input upon a surface of or adjacent to the display. Accordingly, the display 110 may receive mechanical input directly upon the optical output provided by the display.

The tactile input hardware 112 may be any device capable of transforming mechanical, optical, or electrical signals into a data signal capable of being transmitted with the communication path 104. Specifically, the tactile input hardware 112 may include any number of movable objects that each transform physical motion into a data signal that can be transmitted to over the communication path 104 such as, for example, a button, a switch, a knob, a microphone, or the like. While the display 110 and the tactile input hardware 112 are described as components of the HMI 108, it is noted that, in some embodiments, the display 110 and the tactile input hardware 112 may be separate from one another and operate as a single module by exchanging signals via the communication path 104.

As depicted in FIG. 1, the vehicle control system 100 may further comprise a satellite antenna 114 coupled to the communication path 104 and configured to receive signals from global positioning system satellites. For example, the satellite antenna 114 may include one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. For example, in some embodiments, the one or more vehicles may comprise the satellite antenna 114 such that the satellite antenna 114 may receive data indicative of the location of the vehicle.

Moreover, the vehicle control system 100 may comprise a clock 124 coupled to the communication path 104. The clock 124 may provide time of day signals and calendar signals (e.g., month/day/year data, day of the week data, holiday data, or the like) to the processors 102 and other components of the vehicle control system 100. The vehicle control system 100 may operate differently on different days, and/or at different times of a day.

Still referring to FIG. 1, in some embodiments, the vehicle control system 100 includes a network 130, for example, one or more computer networks (e.g., a personal area network, a local area network, or a wide area network), cellular networks, satellite networks and/or a global positioning system and combinations thereof. Example local area networks may include wired Ethernet and/or wireless technologies such as, for example, wireless fidelity (Wi-Fi). Moreover, example personal area networks may include wireless technologies such as, for example, IrDA, Bluetooth, Wireless USB, Z-Wave, ZigBee, and/or other near field communication protocols, and/or wired computer buses such as, for example, USB and FireWire. Suitable cellular networks include, but are not limited to, technologies such as LTE, WiMAX, UMTS, CDMA, and GSM.

Still referring to FIG. 1, the vehicle control system 100 comprises network interface hardware 116 for communicatively coupling the vehicle control system 100 to the network 130. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware, hardware configured to operate in accordance with the Bluetooth wireless communication protocol, and/or any wired or wireless hardware for communicating with other networks and/or devices.

Still referring to FIG. 1, the vehicle control system 100 may comprise direct communications hardware 118. Direct communications hardware 118 may be positioned on or in the one or more vehicles, for example, on both the target vehicle 182 and at least one of the one or more neighboring vehicles 184, as depicted in FIG. 2, facilitating direct communication between the target vehicle 182 and the one or more neighboring vehicles 184. The direct communications hardware 118 may comprise vehicle to vehicle communications hardware (V2V), vehicle to infrastructure communications hardware (V2X), near field communications (NFC) hardware, such as high frequency NFC, radio-frequency identification (RFID) hardware, or the like.

Still referring to FIG. 1, the vehicle control system 100 may further comprise one or more sensors 120 communicatively coupled to the communication path 104. The one or more sensors 120 may be any device capable of outputting a signal indicative of one or more conditional states of the vehicle and/or the environment in which the vehicle operates. The one or more sensors 120 include, but are not limited to, proximity sensors, radar sensors, lidar sensors, image sensors (e.g., camera(s)), temperature sensors, a capacitive displacement sensor, a Doppler effect sensor, an eddy-current sensor, an ultrasonic sensor, a magnetic sensor, and an optical sensor.

In some embodiments, the one or more sensors 120 may be positioned on or in the one or more vehicles, for example, the target vehicle 182 and, in operation, may be able to detect the presence of one or more neighboring vehicles 184 and detect the relative distance, relative speed, and/or the relative acceleration between the target vehicle 182 and the one or more neighboring vehicles 184. Further, the one or more sensors 120 may determine the distance between the target vehicle 182 and one or more lane boundaries 213, 215 of one or more lanes 212, as depicted in FIG. 2, such that, in an autonomous operation, the one or more vehicles may perform a lane tracking operation using the one or more sensors 120 to remain between the lane boundaries 213, 215 while traversing an individual lane 212. Moreover, the one or more sensors 120 may determine in which lane 212 each of the one or more neighboring vehicles 184 is positioned. In some embodiments, the vehicle control system 100 may be able to determine the location of the vehicle, for example, the target vehicle 182 based on a proximity signal outputted by the proximity sensor and in embodiments in which the one or more proximity sensors comprise a camera, the vehicle control system 100 may be able to determine a location of the vehicle, for example, the target vehicle 182, by accessing geotagged data. In some embodiments, the one or more sensors 120 may be utilized to detect a particular make and model of one or more neighboring vehicles 184 to determine one or more autonomous software versions executed by the one or more neighboring vehicles 184.

The vehicle control system 100 is operable to control a plurality of vehicular systems 150 such as, without limitation, a transmission system, a throttle system, a braking system, an autonomous driving system, a lane-keeping assist system, a parking assist system, a steering system, a navigation system, an infotainment system, and the like.

Referring now to FIG. 2, an example vehicle operating environment 170 is depicted. The vehicle operating environment 170 depicted in FIG. 2 provides illustrative context for the various functions of the vehicle control system 100, described below. The vehicle operating environment 170 includes a roadway 210 having one or more lanes, for example, a first lane 214 (e.g., a right lane) and a second lane 216 (e.g., a left lane). Further, the roadway 210 comprises one or more lane boundaries, for example, a first lane boundary 213 positioned between the first lane 214 and the second lane 216. While two lanes are depicted in the roadway 210 of FIG. 2, it should be understood that the roadway 210 may comprise any number of lanes 212. For ease of understanding the vehicle operating environment 170 depicted in FIG. 2, an example coordinate system 201 is depicted. The example coordinate system 201 includes a vehicle forward direction 202, a vehicle reverse direction 204, a vehicle rightward direction 206, and a vehicle leftward direction 208.

In the embodiment of the vehicle operating environment 170 depicted in FIG. 2, the one or more vehicles are depicted, including a target vehicle 182 and the one or more neighboring vehicles 184, which may comprise an automobile or any other passenger or non-passenger vehicle. As used herein, the term "target vehicle" refers to the vehicle having the vehicle control functionalities described herein, such as receiving or otherwise detecting autonomous software versions of neighboring vehicles 184. The term "neighboring vehicle" refers to any vehicle in the operating environment of the target vehicle 182. Some of the plurality of vehicles may comprise autonomous vehicles that navigate their environment with limited human input or without human input. As described in more detail below, the target vehicle 182 is configured to detect the autonomous software version executed by neighboring vehicles 184 to predict future behavior of the neighboring vehicles 184, as well as to understand the physical characteristics and capabilities of the neighboring vehicles 184. Using such information, the vehicle control system 100 of the target vehicle 182 may adapt control of the target vehicle 182 according to the predicted behavior and capabilities of neighboring vehicles 184.

As depicted in the non-limiting example of FIG. 2, the target vehicle 182 is positioned in the second lane 216 and a neighboring vehicle 184 is positioned in the first lane 214. It should be understood that any number of neighboring vehicles 184 may be positioned in any lane.

Referring still to FIGS. 1 and 2, the one or more vehicles, for example, the target vehicle 182 and the one or more neighboring vehicles 184 may comprise an automated drive controller 142 communicatively coupled to the vehicular systems 150. In operation, the automated drive controller 142 provides one or more vehicle control signals to the vehicular systems 150 to control, without limitation, the acceleration, speed, and/or direction of travel of the vehicle (e.g., the target vehicle 182 and/or the one or more neighboring vehicles 184) by controlling one or more systems of the vehicular systems 150, such as, without limitation, the engine system, steering system, transmission system, braking system, or the like. The automated drive controller 142 may utilize data from a plurality of sensors 120 to perform any vehicle control operation such as, without limitation, traveling on a road, merging onto a highway, stopping at a stop sign or a traffic light, changing lanes, passing a neighboring vehicle 184, avoiding obstacles, and any other vehicle control operation.

In some embodiments, the automated drive controller 142 is component of the target vehicle 182 and/or the one or more neighboring vehicles 184. In other embodiments, the automated drive controller 142 is positioned apart from the target vehicle 182 and/or the one or more neighboring vehicles 184 and is communicatively coupled to the vehicular system 150 of the target vehicle 182 and/or the one or more neighboring vehicles 184 using a wireless connection. Further, the automated drive controller 142 may be communicatively coupled to the one or more processors 102 and the one or more memory modules 106 and, in some embodiments, may include at least one of the one or more processors 102 and at least one of the one or more memory modules 106. In one example, the automated drive controller 142 may operate as an adaptive cruise control system that outputs vehicle control signals to the vehicular systems 150 such that the vehicular system 150 automatically adjusts the speed of the vehicle (for example, the target vehicle 182) to maintain a separation distance between the target vehicle 182 and another vehicle. For example, an individual neighboring vehicle 184 located ahead of the target vehicle 182 in the vehicle forward direction 202 and in the same lane as the target vehicle 182.

In operation, the automated drive controller 142 may output one or more vehicle control signals to the vehicular system 150. The one or more vehicle control signals of the automated drive controller 142 may comprise an acceleration control signal which includes instructions regarding a desired acceleration rate of the target vehicle 182 and a deceleration control signal which includes instructions regarding a desired deceleration rate of the target vehicle 182. While the autonomous operation is primarily described herein with respect to the target vehicle 182, it should be understood that the one or more neighboring vehicles 184 may also comprise vehicular systems communicatively coupled to an automated drive controller configured to control the one or more neighboring vehicles 184 based on an autonomous operation profile.

There are many different automobile manufacturers that manufacture and sell various models of vehicles. As described above, autonomous vehicles may be controlled by autonomous software. As software is always being updated, multiple versions of autonomous software may be running on various vehicles in the environment. There may be differences among the plurality of autonomous software versions regarding how the vehicles are controlled in various situations.

Embodiments of the present disclosure store a plurality of autonomous software versions in a data structure, such as the first database 107A depicted in FIG. 1. A behavior profile may be stored for at least some of the autonomous software versions stored in the data structure. In some embodiments, the behavior profiles may be stored in a lookup table for access by the vehicle control system 100. Each behavior profile stored within the data structure includes data indicative of how the particular autonomous software version controls the particular vehicle in a plurality of situations (i.e., autonomous control attributes). The number and type of situations is not limited by this disclosure. As non-limiting examples, the types of situations in which the autonomous software version may control the particular vehicle includes acceleration to a cruising speed, a cruising speed, merging on a highway, changing of lanes, stopping at a stop sign or traffic light, accelerating from a stop sign or traffic light, traveling through a yellow light of a traffic light, making a turn in an intersection, and the like. As stated above, each autonomous software version may control the vehicle differently in the various types of situations. Thus, the behavior profiles for the various autonomous software versions are stored within a data structure (e.g., within the first database 107A) for access and usage by the automated drive controller 142 or other autonomous vehicle control system 100 of the target vehicle 182.

In some embodiments, one or more of the behavior profiles may also include vehicle characteristic attributes regarding the vehicle that the autonomous software version controls. As an example, the autonomous software version may indicate the make and model of the vehicle on which it operates. For example, a first autonomous software version may operate on a vehicle of Make A, Model X, and a second autonomous software version may operate on a vehicle of Make A, Model Y. The vehicle characteristic data will be different between makes and models of vehicles. The type of vehicle characteristic data stored in the behavior profile is not limited by this disclosure. Types of vehicle characteristic data includes, but is not limited to, vehicle type (e.g., passenger vehicle, pickup truck, sport utility vehicle, box truck, and the like), vehicle dimensions, vehicle weight, top speed, acceleration, braking characteristics, and the like. It should be understood that, in some embodiments or situations, no vehicle characteristic data may be stored with one or more autonomous software versions.

Data regarding the behavior profiles may be obtained by any manner. In some cases, the automobile manufacture may make behavior profile data publicly available for other automobile manufactures to utilize. In other cases, the operational behavior of vehicles operating on respective autonomous software versions may be gathered by testing vehicles operating on the respective autonomous software version in a test environment. For example, a vehicle running a particular autonomous software version may be evaluated in a test environment by putting the vehicle through different situations, such as, without limitation, braking, merging onto a highway, stopping at a stop sign or a traffic light, and the like. Data regarding the behavior profiles may also be collected by evaluating, using various sensors 120, operational behavior of vehicles running various autonomous software versions. In this manner, data regarding operational behavior of various autonomous software versions may be collected and stored as behavior profiles for use by the vehicle control system 100. It should be understood that other methods of collected data for the behavior profiles are also possible.

Referring once again FIG. 2, the vehicle control system 100 of the target vehicle 182 is operable to detect or otherwise determine the autonomous software version of the neighboring vehicle 184. Once the autonomous software version of the neighboring vehicle 184 is detected or otherwise detected, its associated behavior profile is accessed and may be utilized by the vehicle control system 100 (e.g., by the automated drive controller 142) to predict the behavior of the neighboring vehicle 184, and adjust control of the target vehicle 182 accordingly.

Figure 3:
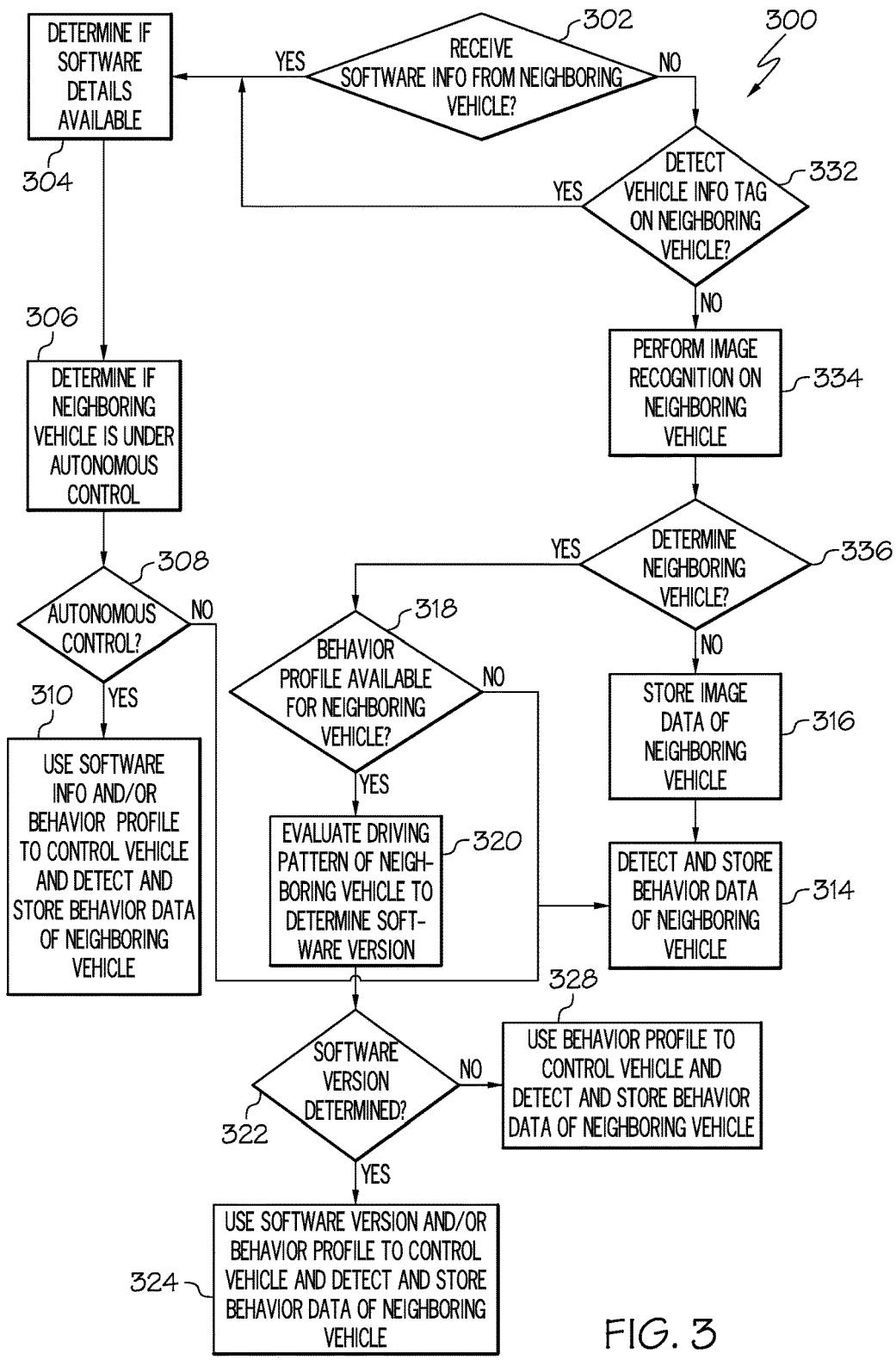
FIG. 3 graphically depicts an example process of controlling a vehicle by determining an autonomous software version and utilizing a behavior profile associated with the determined autonomous software version according to one or more embodiments shown and described herein.

Referring now to FIG. 3, an example method 300 of controlling a vehicle by determining an autonomous software version and utilizing a behavior profile associated with the determined autonomous software version is schematically illustrated. It should be understood that the method illustrated in FIG. 3 is for illustrative purposes only, and embodiments are not limited by the order of the actions depicted in FIG. 3. In block 302, it is determined whether or not an autonomous software version of a neighboring vehicle 184 is received. The autonomous software version may be detected or otherwise determined or received in a variety of ways. Referring once again to FIG. 2, the neighboring vehicle 184 may wirelessly transmit a signal 190A that includes the autonomous software version executed by the neighboring vehicle 184. The signal 190A may be emitted by direct communications hardware 118, for example. The signal 190A may be wirelessly transmitted by any known or yet-to-be-developed wireless communications protocol. Similarly, the target vehicle 182 may also wirelessly transmit a signal 190B broadcasting its own autonomous software version to the neighboring vehicle 184. Accordingly, the target vehicle 182 may communicate with one or more neighboring vehicles by vehicle-to-vehicle communication in some embodiments.

The target vehicle 182 may receive the signal 190A from the neighboring vehicle 184 (e.g., by the direct communications hardware 118), and decode the autonomous software version from the signal 190A. The process may then move to block 304, which is described below.

Figure 4:
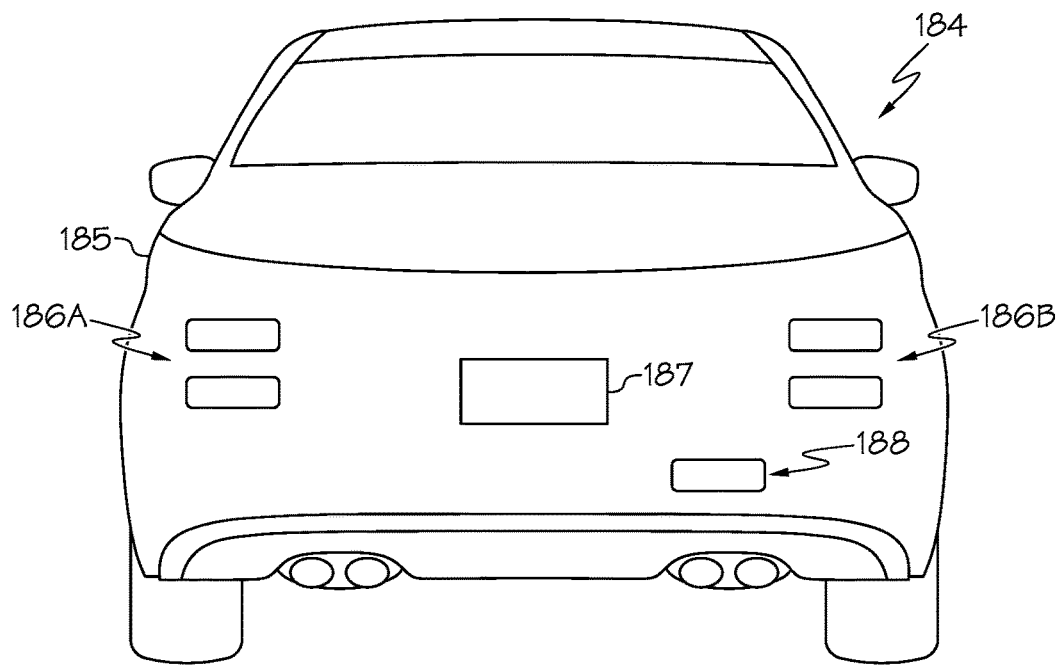
FIG. 4 schematically depicts a rear view of an example vehicle according to one or more embodiments shown and described herein.
Figure 5:
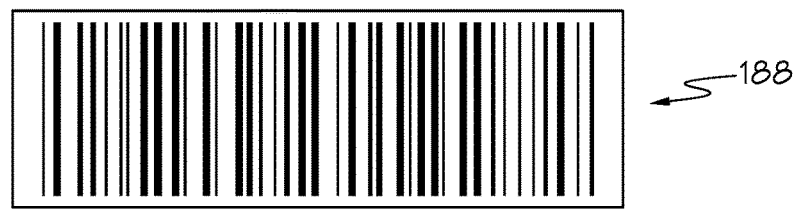
FIG. 5 schematically depicts an example tag for indicating an autonomous software version according to one or more embodiments shown and described herein.

If the autonomous software version is not received from the neighboring vehicle 184, it may be determined in other ways. Referring to block 332 of FIG. 3 and generally to FIG. 4, a tag 188 or other marker (e.g., decal, painted pattern, and the like) may be disposed on one or more locations of the neighboring vehicle 184. The tag 188 includes a code that is detectable by one or more sensors 120 of the target vehicle 182. The code of the tag 188 may take on any configuration such as, without limitation, a bar code, a two-dimensional code (e.g., a QR code), and the like. An example tag 188 is schematically depicted in FIG. 5. The one or more sensors 120 detects the code of the tag 188, and the vehicle control system 100 decodes the code of the tag 188 to determine the autonomous software version of the neighboring vehicle 184 (e.g., the one or more processors 102 may decode the coded of the tag 188). In this manner, the autonomous software version of the neighboring vehicle 184 may be determined.

Once the autonomous software version of the neighboring vehicle 184 is known, the process may move to block 304, where it is determined whether or not there are software details regarding the autonomous software version available in the data structure. As stated above, manufacturers may provide specific details with respect to how the autonomous software version controls the neighboring vehicle 184. For example, the software details may provide information regarding how the neighboring vehicle 184 is controlled in certain situations, such as, without limitation, how the neighboring vehicle 184 merges on to the highway, how the neighboring vehicle 184 stops at a stop sign or a traffic light, how the neighboring vehicle 184 changes lanes, and the like. The software details may be stored as data within a behavior profile associated with the detected autonomous software version in the data structure. If software details are available, they may be used by the vehicle control system 100 to predict future behavior of the neighboring vehicle, as described below.

The process then moves to block 306. In some embodiments, the vehicle control system 100 determines whether or not the neighboring vehicle 184 is under autonomous control. In other embodiments, it is not determined whether or not the neighboring vehicle 184 is under autonomous control. Rather, it is assumed that the neighboring vehicle 184 is under autonomous control.

In some embodiments, the signal 190A broadcast by the neighboring vehicle 184 may indicate whether or not the neighboring vehicle 184 is under autonomous control (i.e., the signal 190A may include an operational status signal indicative of autonomous control). The vehicle control system 100 may determine whether or not the neighboring vehicle 184 is under autonomous control or human control in other ways. In another example, the one or more sensors 120 may monitor the operations of the neighboring vehicle 184 over period of time to detect a driving behavior pattern of the neighboring vehicle 184. Based on the behavior profile associated with the determined autonomous software version stored within the data structure, there are expected, known driving behavior patterns for a known autonomous software version in certain driving situations when the neighboring vehicle 184 is under autonomous control. As an example and not a limitation, the neighboring vehicle 184 is expected to change lanes in a certain manner in accordance with the stored behavior pattern. The period of time may be any period of time, such as, without limitation, ten seconds, thirty seconds, one minute, two minutes, five minute, or ten minutes.

If, using the one or more sensors 120, it is determined that the driving behavior pattern is in accordance with (i.e., matches) a known driving behavior pattern stored in the behavior profile, the vehicle control system 100 may determine that the neighboring vehicle 184 is under autonomous control. The process may move to block 310 where the behavior profile of the autonomous software version is used by the vehicle control system 100 to predict future behavior of the neighboring vehicle 184 and control the vehicular systems 150 accordingly. Further, the one or more sensors 120 may be used to detect and store behavior data of the neighboring vehicle 184 for inclusion as additional data within the behavior profile associated with the particular autonomous software version.

Referring once again to FIG. 3, at block 308 if is determined that the driving behavior pattern is not in accordance with (i.e., does not match) a known driving behavior pattern stored in the behavior profile, the vehicle control system 100 may determine that the neighboring vehicle 184 is under human control. If it is determined that the neighboring vehicle 184 is under human control, the process may move to block 314, where the one or more sensors 120 may be used to monitor and record behavior data of the neighboring vehicle 184 such as, without limitation, acceleration, braking, speed, and the like. This data may then be added to the behavior profile associated with the autonomous software version.

Referring again to block 332, if there is no tag 188 detected on the neighboring vehicle 184, the process may move to block 334, wherein the make, model and/or year of the neighboring vehicle 184 may be determined by object recognition. The one or more sensors 120 may include an image sensor (e.g., a camera) that creates image data of the neighboring vehicle 184. Features of the neighboring vehicle 184 may be detected by any known or yet-to-be-developed image/object recognition algorithm. Features may include, without limitation, a first brake light 186A, a second brake light 186B, a license plate 187 placement, outline of the vehicle body 185, and the like. It should be understood that many other features of the neighboring vehicle 184 may be detected. Non-limiting object detection algorithms include scale-invariant feature transform (SIFT), speeded up robust features (SURF), and gradient location and orientation histogram (GLOH).

The detected features of the neighboring vehicle 184 may be compared with features of a plurality of reference vehicles stored in a data structure. If none of the features of the neighboring vehicle 184 match features of one of the reference vehicles at block 336 (e.g., match below a predetermined confidence threshold), the process may move to block 316, where image data of the neighboring vehicle 184 is stored in a data structure for future reference. At block 314, the sensors 120 may be used to detect and store behavior data of the neighboring vehicle 184 to potentially build a behavior profile for the neighboring vehicle 184.

If the features of the neighboring vehicle 184 match features of one of the reference vehicles (e.g., above a predetermined confidence threshold), then the neighboring vehicle 184 may be determined to be the reference vehicle. With the make, model and/or year of the neighboring vehicle 184 known, the process may move to block 318 where it is determined whether or not there is a behavior profile associated with the neighboring vehicle 184. If there is not a behavior profile or software details associated with the neighboring vehicle 184, the process may move to block 314, where the sensors 120 may be used to detect and store behavior data off the neighboring vehicle 184 to potentially build a behavior profile for the neighboring vehicle 184.

If there is a behavior profile or software details for the neighboring vehicle 184 at block 318, the process may move to block 320 where the one or more sensors 120 are used to evaluate a driving pattern of the neighboring vehicle 184 over a period of time to determine which version of the autonomous software is being run by the neighboring vehicle 184. The period of time may be any period of time, such as, without limitation, ten seconds, thirty seconds, one minute, two minutes, five minute, or ten minutes.

As stated herein, various versions of autonomous software may control the neighboring vehicle 184 in different ways in various situations. As stated above, there may expected, known driving behavior patterns in certain driving situations indicative of a particular version of a particular autonomous software. As an example and not a limitation, the neighboring vehicle 184 is expected to change lanes in a certain manner in accordance with the stored behavior pattern. The known driving behavior patterns may be developed in any manner, such as being made available by an automobile manufacture, developed by testing vehicles under test conditions, and/or by observing the behavior of vehicles in the field.

In some embodiments, information regarding known driving behavior patterns of autonomous software versions may be stored in a data structure, such as in the second database 107B illustrated in FIG. 2, for example. At block 322, the detected driving behavior pattern of the neighboring vehicle 184 may be compared with a plurality of known driving behavior patterns of autonomous software versions associated with the neighboring vehicle 184. The autonomous software version associated with the known driving pattern that most closely matches the driving pattern of the neighboring vehicle 184 may be selected as the autonomous software version to be utilized by the vehicle control system 100. The selected autonomous software version that is selected may be associated with a known driving behavior pattern that matches the driving behavior pattern of the neighboring vehicle 184 with a higher degree of confidence than the other autonomous software versions. If one of the known driving behavior patterns match, and an autonomous software version is determined at block 322, the process may move to block 324, where the vehicle control system 100 may use the behavior profile (i.e., a behavior profile with or without software details provided by the manufacturer of the neighboring vehicle 184) associated with the determined autonomous software version to control the target vehicle 182. The vehicle control system 100 may also detect and store behavior data of the neighboring vehicle 184 for future use.

In some cases, the known driving patterns for the autonomous software versions may be indiscernibly similar such that the vehicle control system 100 cannot distinguish between autonomous software versions. In other cases, a behavior profile may be stored for a particular vehicle, but individual versions of the autonomous software versions are unknown. If it is determined that the neighboring vehicle 184 is under autonomous control with a certain threshold of confidence and there is a behavior profile associated with the neighboring vehicle 184, but the individual version of the autonomous software is unknown, the process may move from block 322 to block 328. At block 328, the vehicle control system 100 may use a behavior profile to predict future behavior of the neighboring vehicle 184 and to control the target vehicle 182. For example, the behavior profile may be associated with, and applicable to, a plurality of autonomous software versions associated with the neighboring vehicle 184. In this case, software details are unknown and thus only the behavior profile is used to predict future behavior of the neighboring vehicle 184.

If none of the known driving behavior patterns match at block 322, the vehicle control system 100 may determine that the neighboring vehicle 184 is under human control. If it is determined that the neighboring vehicle 184 is under human control, the vehicle control system 100 may detect and store behavior data of the neighboring vehicle 184 for future use (see block 314).

Referring once again to FIG. 2, a behavior profile associated with the autonomous software version executed by the neighboring vehicle 184 may be used by the vehicle control system 100 to control the target vehicle 182 to perform vehicular operations. In one non-limiting example, the target vehicle 182 vehicle is under autonomous control. The target vehicle 182 is traveling in the second lane 216 and may pass the neighboring vehicle 184 in the first lane 214. The vehicle control system 100 of the target vehicle 182 may access the behavior profile of the autonomous software version executed by the neighboring vehicle 184 to predict future behavior of the neighboring vehicle 184. The behavior profile may indicate the speed at which the neighboring vehicle 184 may travel, how the neighboring vehicle 184 may operate under current road conditions, how the neighboring vehicle 184 may operate as a result of being passed by the target vehicle 182, and/or any other predicted behavior. In this manner, the target vehicle 182 may possess additional information regarding the neighboring vehicle 184 such that it may successfully pass the neighboring vehicle 184.

Figure 6:
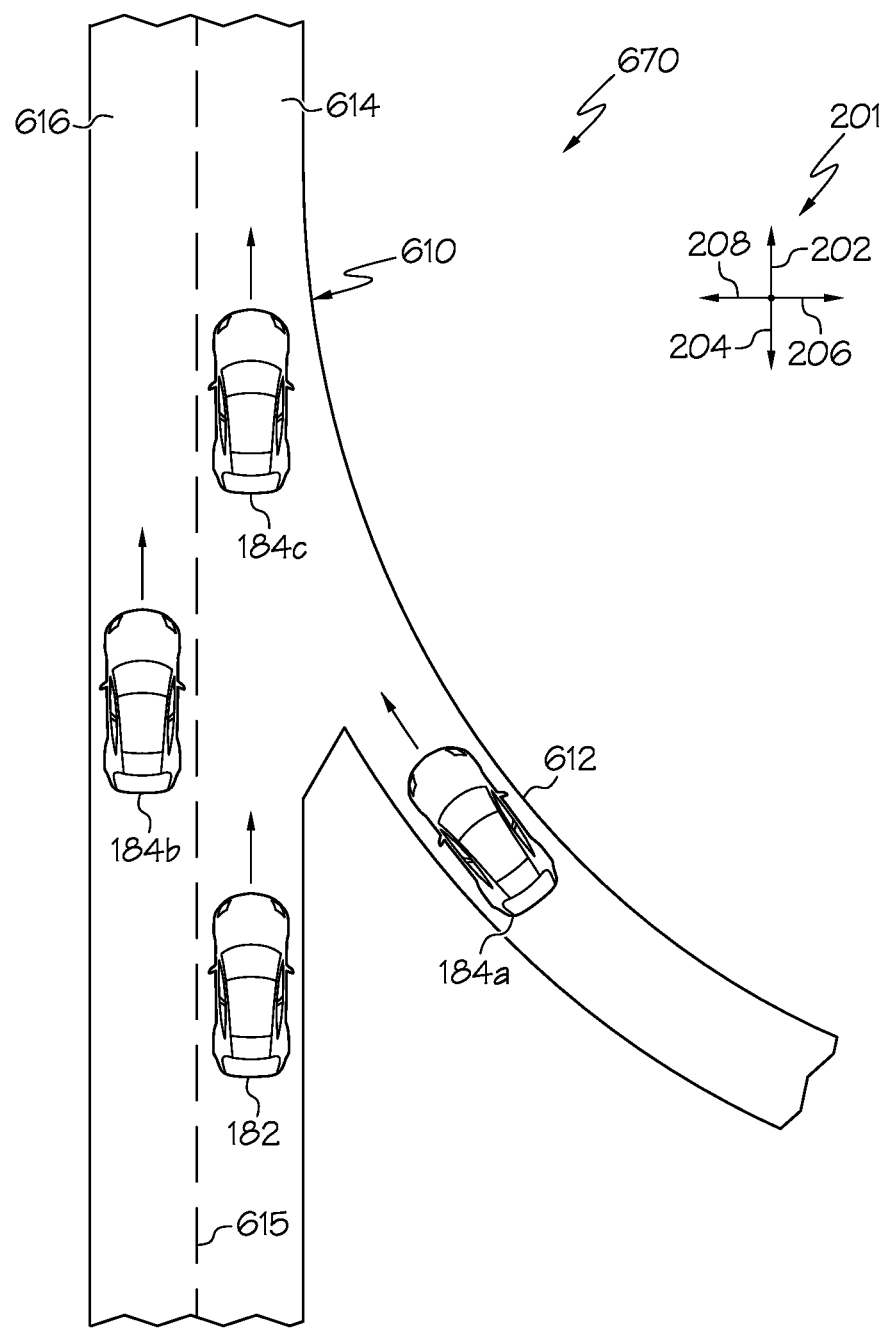
FIG. 6 schematically depicts an example vehicle operating environment including a neighboring vehicle merging onto a roadway according to one or more embodiments shown and described herein.

Referring now to FIG. 6, another non-limiting example of how a behavior profile of one or more neighboring vehicles 184 may be utilized is schematically illustrated. In the illustrated example, a target vehicle 182, a first neighboring vehicle 184a, a second neighboring vehicle 184b, and a third neighboring vehicle 184c are operating in an environment 670. The environment 670 includes a roadway having a first lane 614 (i.e., a right lane) and a second lane 616 (i.e., a left lane). In the example, the target vehicle 182 is traveling in the first lane 614 behind the third neighboring vehicle 184c. The second neighboring vehicle 184b is in front of the target vehicle 182 in the second lane 616. The first neighboring vehicle 184a is traveling on an entrance ramp 612 toward the first lane 614. Using any of the methods described herein, the target vehicle 182 may detect or otherwise determine the autonomous software version of the first neighboring vehicle 184a. The behavior profile of the autonomous software version of the first neighboring vehicle 184a may be accessed by the target vehicle 182 to predict how the first neighboring vehicle 184a will merge into the first lane 614 if it is determined that the first neighboring vehicle 184a is under autonomous control. For example, the target vehicle 182 may use the one or more sensors 120 to determine that the vehicular operation of the first neighboring vehicle 184a is a merge operation. Data with respect to a merge operation of the particular behavior profile of the first neighboring vehicle 184a may be accessed to predict how the first neighboring vehicle 184a will operate when merging into the first lane 614. Understanding how the first neighboring vehicle 184a will merge, the vehicle control system 100 of the target vehicle 182 may control the target vehicle 182 by taking into account the predicted behavior of the neighboring vehicle 184a. For example, the vehicle control system 100 may instruct one or more vehicular systems 150 of the target vehicle 182 to speed up, slow down, change lanes, or take any other action based on the predicted behavior of the first neighboring vehicle 184a.

The target vehicle 182 may also detect or otherwise determine the autonomous software versions of the second neighboring vehicle 184b and the third neighboring vehicle 184c to predict their future behavior with respect to the merging first neighboring vehicle 184a as well as their general operating traveling on the roadway 610.

Figure 7:
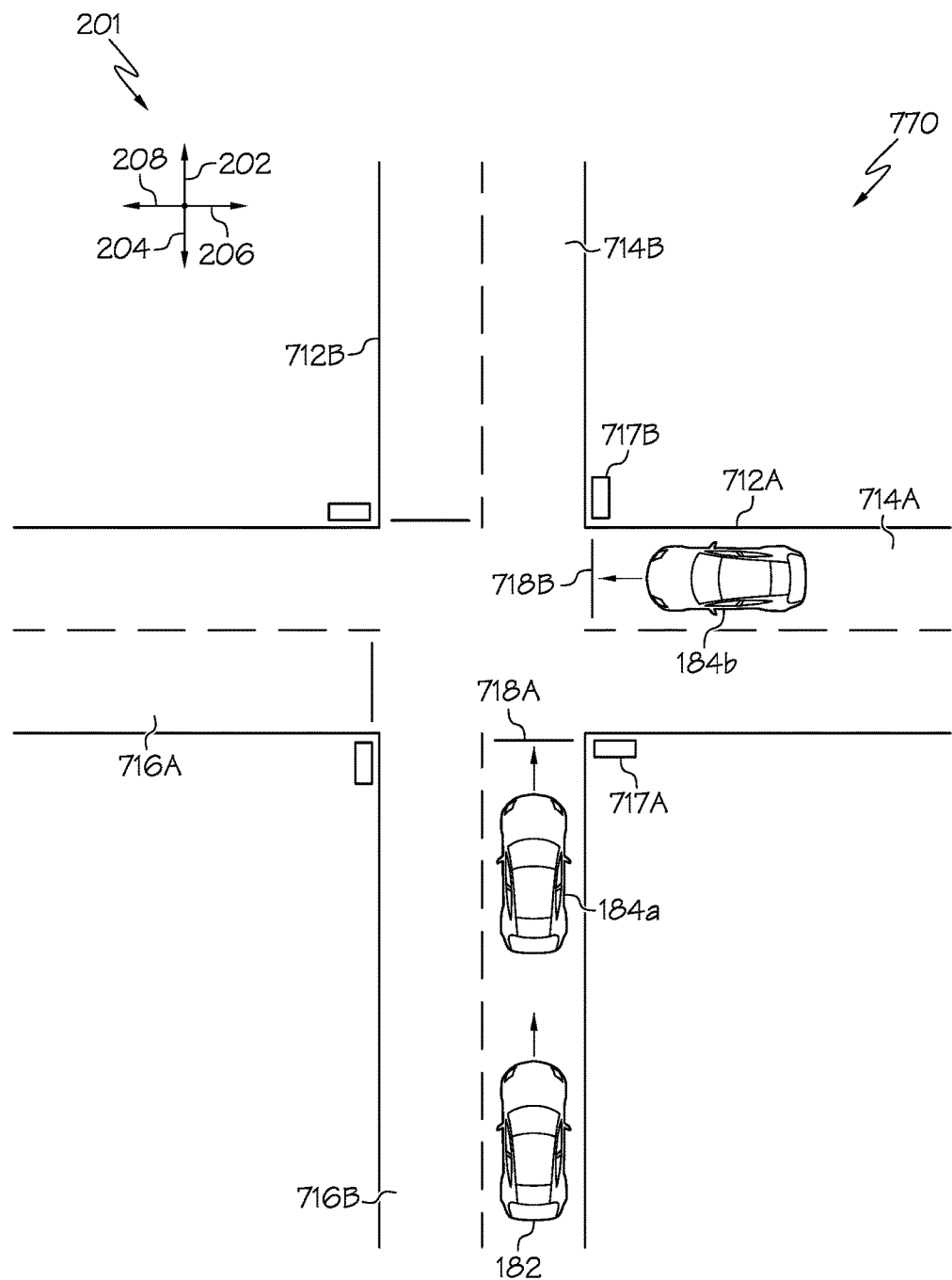
FIG. 7 schematically depicts an example vehicle operating environment including an intersection according to one or more embodiments shown and described herein.

Referring now to FIG. 7, another non-limiting example of an environment 770 in which a target vehicle 182 may operate is schematically illustrated. The example environment includes a first street 712A that intersects with a second street 712B. The first street 712A has a first lane 714A and a second lane 716A. Similarly, the second street 712B has a first lane 714B and a second lane 716B. In the illustrated example, the target vehicle 182 is traveling behind a first neighboring vehicle 184a in the first lane 714B of the second street 712B. The first neighboring vehicle 184a is approaching a traffic stop line 718A adjacent stop sign 717A. The second neighboring vehicle 184b is traveling in the first lane 714A of the first street 712A and is approaching a stop line 718B adjacent stop sign 717B.

The target vehicle 182 may detect or otherwise determine an autonomous software version executed by the first neighboring vehicle 184a. The target vehicle 182 may access a behavior profile of the detected autonomous software version of the first neighboring vehicle 184a. The target vehicle 182 may further determine that the vehicular operation of the first neighboring vehicle 184a is approaching and stopping at stop sign 717A. If it is determined that the first neighboring vehicle 184a is under autonomous control, the behavior profile may be utilized by the target vehicle 182 to predict how the first neighboring vehicle 184a will approach and stop at the stop sign 717A. As non-limiting examples, the behavior profile may indicate that the first neighboring vehicle 184a may decelerate at a particular rate, may stop at a particular location relative to the stop sign 717A and/or traffic stop line 718A, how long the first neighboring vehicle 184a will stopped after the first neighboring vehicle 184a has the right away to travel into the intersection, and/or other behavioral attributes. Similarly, the target vehicle 182 may also use a behavior profile of an autonomous software version of the second neighboring vehicle 184b to predict how it will operate with respect to the intersection and the stop sign 717B. Further, each of the first neighboring vehicle 184a and the second neighboring vehicle 184b may detect the autonomous software versions of the other remaining vehicles to predict how the other remaining vehicles will operate with respect to the intersection.

It should now be understood that embodiments described herein are directed to vehicle control systems, such as autonomous or semi-autonomous vehicle control systems, that detect or otherwise determine an autonomous software version of neighboring vehicles to predict future behavior of neighboring vehicle. The predicted future behavior of neighboring vehicles may provide additional information to the vehicle control system such that the vehicle control system may control the vehicle in a manner that accounts for the future behavior of the neighboring vehicles.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle control system of a vehicle, the vehicle control system comprising:
   one or more processors; and
   one or more non-transitory memory modules communicatively coupled to the one or more processors and storing machine-readable instructions that, when executed, cause the one or more processors to perform at least at the following:
   detect a neighboring vehicle within an environment;
   determine an autonomous software version executed by the neighboring vehicle;
   determine a behavior profile associated with the autonomous software version; and
   control one or more vehicle systems of the vehicle based at least in part on the behavior profile associated with the autonomous software version.

2. The vehicle control system of claim 1, wherein:
the machine-readable instructions further cause the one or more processors to predict a predicted behavior of the neighboring vehicle based at least on part on the behavior profile associated with the autonomous software version; and
the control of the one or more vehicle systems of the vehicle is further based on the predicted behavior of the neighboring vehicle.

3. The vehicle control system of claim 1, wherein detection of the neighboring vehicle comprises:
receiving image data from one or more image sensors;
comparing the image data to a plurality of reference vehicle data; and
selecting an individual reference vehicle as the neighboring vehicle when the image data matches reference vehicle data of the individual reference vehicle.

4. The vehicle control system of claim 3, wherein the machine-readable instructions further cause the one or more processors to:
detect a driving behavior pattern of the neighboring vehicle over a period of time;
compare the driving behavior pattern with one or more known driving behavior patterns associated with one or more known autonomous software versions of the neighboring vehicle; and
select a known autonomous software version associated with a known driving behavior pattern that matches the driving behavior pattern of the neighboring vehicle as the autonomous software version.

5. The vehicle control system of claim 1, wherein the neighboring vehicle is detected, and the autonomous software version is determined, by receiving a signal transmitted by the neighboring vehicle.

6. The vehicle control system of claim 1, wherein:
the machine-readable instructions further cause the one or more processors to control one or more sensors to detect a tag positioned on the neighboring vehicle; and
the neighboring vehicle is detected, and the autonomous software version is determined, by information associated with the tag.

7. The vehicle control system of claim 1, wherein the machine-readable instructions further cause the one or more processors to detect whether the neighboring vehicle is under autonomous control or under human control.

8. The vehicle control system of claim 7, wherein the machine-readable instructions further cause the one or more processors to receive an operational status signal from the neighboring vehicle indicative of whether the neighboring vehicle is under autonomous control or under human control.

9. The vehicle control system of claim 7, wherein whether the neighboring vehicle is under autonomous control or under human control is determined by:
detecting a driving behavior pattern of the neighboring vehicle over a period of time; and
comparing the driving behavior pattern of the neighboring vehicle with one or more known driving behavior patterns associated with the autonomous software version of the neighboring vehicle, wherein:
the neighboring vehicle is determined to be under autonomous control when the driving behavior pattern matches at least one of the one or more known driving behavior patterns associated with the autonomous software version of the neighboring vehicle; and
the neighboring vehicle is determined to be under human control when the driving behavior pattern does not match at least one of the one or more known driving behavior patterns associated with the autonomous software version of the neighboring vehicle.

10. The vehicle control system of claim 1, wherein the behavior profile is determined from a lookup table storing a plurality of behavior profiles associated with a plurality of autonomous software versions.

11. The vehicle control system of claim 1, wherein the behavior profile comprises one or more autonomous control attributes and one or more vehicle characteristic attributes.

12. A method of controlling a vehicle, the method comprising:
detecting a neighboring vehicle within an environment;
determining an autonomous software version executed by the neighboring vehicle;
determining a behavior profile associated with the autonomous software version; and
controlling one or more vehicle systems of the vehicle based at least in part on the behavior profile associated with the autonomous software version.

13. The method of claim 12, wherein:
the method further comprises predicting a predicted behavior of the neighboring vehicle based at least on part on the behavior profile associated with the autonomous software version; and
the control of the one or more vehicle systems of the vehicle is further based on the predicted behavior of the neighboring vehicle.

14. The method of claim 12, wherein detecting the neighboring vehicle comprises:
receiving image data from one or more image sensors;
comparing the image data to a plurality of reference vehicle data; and
selecting an individual reference vehicle as the neighboring vehicle when the image data matches reference vehicle data of the individual reference vehicle.

15. The method of claim 14, further comprising:
detecting a driving behavior pattern of the neighboring vehicle over a period of time;
comparing the driving behavior pattern with one or more known driving behavior patterns associated with one or more known autonomous software versions of the neighboring vehicle; and
selecting a known autonomous software version associated with a known driving behavior pattern that matches the driving behavior pattern of the neighboring vehicle as the autonomous software version.

16. The method of claim 12, further comprising receiving a signal transmitted by the neighboring vehicle, wherein:
the neighboring vehicle is detected by receipt of the signal; and
the signal comprises the autonomous software version.

17. The method of claim 12, further comprising detecting a tag positioned on the neighboring vehicle, wherein:
the neighboring vehicle is detected by detecting the tag; and
the autonomous software version is determined by detecting the tag.

18. The method of claim 12, further comprising detecting whether the neighboring vehicle is under autonomous control or under human control.

19. The method of claim 18, further comprising receiving an operational status signal from the neighboring vehicle indicative of whether the neighboring vehicle is under autonomous control or under human control.

20. The method of claim 18, wherein whether the neighboring vehicle is under autonomous control or under human control is determined by:
- detecting a driving behavior pattern of the neighboring vehicle over a period of time; and
- comparing the driving behavior pattern of the neighboring vehicle with one or more known driving behavior patterns associated with the autonomous software version of the neighboring vehicle, wherein:
  - the neighboring vehicle is determined to be under autonomous control when the driving behavior pattern matches at least one of the one or more known driving behavior patterns associated with the autonomous software version of the neighboring vehicle; and
  - the neighboring vehicle is determined to be under human control when the driving behavior pattern does not match at least one of the one or more known driving behavior patterns associated with the autonomous software version of the neighboring vehicle.

* * * * *